(No Model.)

H. S. HOY.
DUMPING WAGON.

No. 532,785. Patented Jan. 22, 1895.

ATTEST.
J. Henry Kaiser
Waldo Tastet

INVENTOR.
Henry S. Hoy.
By Geo. B. Shepard
Atty.

UNITED STATES PATENT OFFICE.

HENRY S. HOY, OF WADDINGTON, NEW YORK.

DUMPING-WAGON.

SPECIFICATION forming part of Letters Patent No. 532,785, dated January 22, 1895.

Application filed June 12, 1894. Serial No. 514,338. (No model.)

*To all whom it may concern:*

Be it known that I, HENRY S. HOY, a citizen of the United States of America, and a resident of Waddington, in the county of St.
Lawrence and State of New York, have invented certain new and useful Improvements in Dumping-Wagons, of which the following is a specification.

My invention relates to that class of dumping wagons in which the bottom boards are dropped from their normal position in order to discharge the load; and its objects are simplicity and economy of construction so that it may be easily repaired with tools in common use, and to afford facility in freeing the wagon from its discharged load, while providing the wagon box with low sides to make the labor of loading the wagon by hand as light as possible, and also to employ for the wheels and forward running gear of said dumping wagon the light parts from the ordinary wagon when so desired. I attain these objects by the mechanism illustrated in the accompanying drawings, in which—
Figure 1, is a perspective side view of my improved dumping wagon with the wheels, tongue and hounds omitted to afford clearer illustration, and Fig. 2, is an end view of a vertical section of the same at the line marked *x—y* in Fig. 1, looking toward the rear thereof.

Similar letters refer to corresponding parts throughout both figures.

Figure 1:
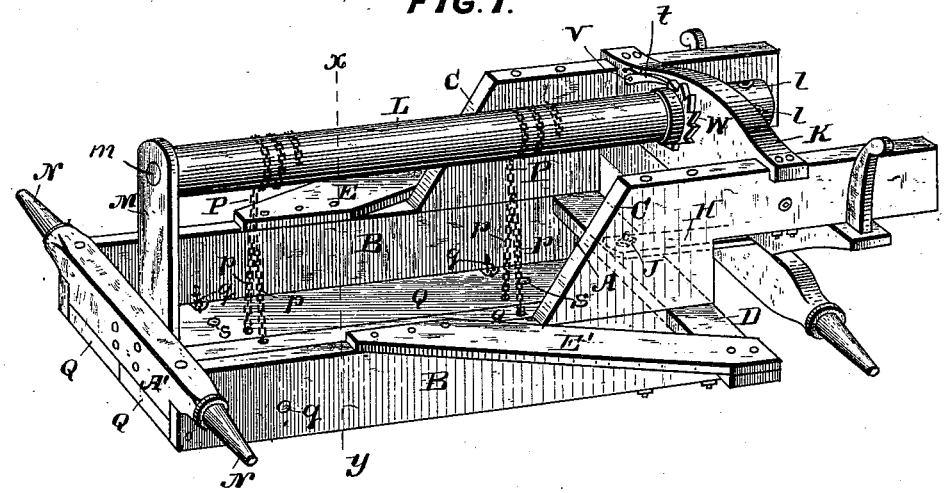

I construct the sides B, B, of my wagon box of plank and fasten them rigidly at their rear ends to the hind axletree A', and their front ends to the plank end piece A, as shown at Fig. 1, by any of the means commonly employed for the like purpose such as nails, screws, bolts, &c, the rear axletree thus serving for one end of the wagon box. To the forward upper edges of such side planks I fasten other pieces of plank C, C, by means of bolts passing through the same so as to form a vertical offset of about ten inches for some four feet beyond their forward ends; but first interpose between said side planks and such offset pieces, and over the forward end plank A, of said wagon box, a transverse plank D, so as to project about sixteen inches from the body of the wagon box on each side. To the ends of this transverse plank D, and to the upper edge of the side planks B, I fasten the braces E, and E', as shown, thereby bracing the wagon box from racking cornerwise. The forward ends of such offset pieces C, and C, are adapted to rest upon the forward bolster of the ordinary farm wagon as shown; but it is obvious that any other known forward running gear for wagons may be used therewith. When such farm wagon running gear is used, a short reach H, (shown by the dotted lines in Fig. 1,) is fastened to the forward axle in place of the ordinary reach and its rear end is fastened to the middle of said transverse plank D, by a bolt and nut J, or other ordinary means. Between said offset planks C, and C, and about midway on their upper edges I secure the bridge piece K, having near its upper center a hole through the same in which is journaled the windlass L; said windlass having at its forward end capstan bar holes *l*, for revolving the same, and at its rear end the gudgeon *m*, adapted to journal in the upper part of the rear standard M, as shown. This standard M, is constructed of plank or suitable known material and its upper end is formed so as to support the end of said windlass L, and at its lower end is securely fastened in an upright position to the middle of the axletree A', by bolts or suitable means as shown. To the outer ends of said axletree A', are secured in the ordinary manner the axle skeins N, N, which may be adapted to fit the ordinary farm wagon wheels.

Figure 2:
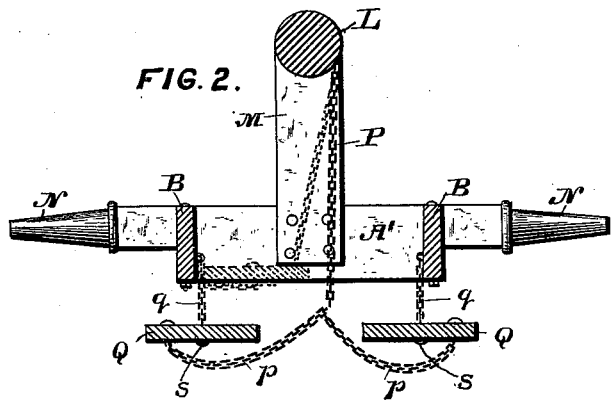

The bottom boards Q, Q, are loosely attached to the side planks B, B, of the wagon box, respectively, by the chains *q, q*; as shown more plainly at Fig. 2, one end of each said chains *q, q*, being secured to the interior of one of the side planks B, about midway of its width; and the other end thereof to the under side of the bottom board Q, about midway of its width, either by a bolt and shackle *s* or suitable known means. These chains *q*, are preferably four in number so as to support each end of the two leaves Q, forming the bottom of the wagon box, and are of such length that when the said leaves are turned into their proper place in said wagon box said chains *q*, will hold the lower outer edge of said leaf even with the lower edge of the side plank B, to which it is fastened by said chains *q*; as shown by the dotted lines in Fig. 2, where the bottom board on one side is thus shown drawn up to its proper place. Said leaves or bottom boards Q, Q, are of such width as together to fill the space between the bottom of said side planks B, B. To the interior of each of said bottom boards Q, Q, at suitable distances apart, and near the inside edge, thereof, are secured one end of each of the chains p, p, by staples, bolts or similar fastenings; and the other ends of said chains p, p, are united, in opposite pairs as shown, to the end of a windlass chain P, the other end of which is wound around and secured to the windlass L, so as to wind and unwind thereon as said windlass is revolved in opposite directions respectively, both chains P, and P, being wound thereon in the same direction.

It is obvious that to save cutting, the chain P after being fastened to the bottom board at or near its edge, as shown, may be continued through, or around the edge of, such bottom board and fastened near the middle of its opposite side and continued therefrom to form the chain q above described; but, as this manner of construction in no wise affects the function of either end of such chain or the working of the machine, it is not illustrated, and in this specification the holding chain q and the lifting chain p, whether separate or connected, are treated as two separate chains.

Around the windlass L, and near its forward journal is securely fastened the ratchet ring W, the teeth of which engage with the pawl t, pivotally attached to the piece K, at V; for the purpose of arresting the revolutions of said windlass in the direction of unwinding the chains P, P, thereon.

In operation, said apparatus being mounted on the wheels and forward running gear of any ordinary wagon the bottom boards Q, Q, are drawn up to their normal position within the wagon box as shown at Fig. 1, by means of said chains P, P, being wound upon said windlass, by an ordinary hand bar placed in the holes l, l, as commonly employed for the like purpose; and the load is placed within said wagon box and drawn to the desired place of deposit; when the pawl t, is lifted from contact with the ratchet ring W, by any ordinary means, and the chains P, P allowed thereby to unwind from the windlass, and the bottom boards to be dropped by the weight of the load. It is obvious that when this occurs the bottom boards being held to the side planks B, and B, respectively by the chains q, q, only, will turn upside down, and swing outward allowing the load to drop under them; and that when the said wagon is drawn forward from the material so deposited, the play allowed to said bottom boards by the length of the chains q, q, q, q, will suffice for them to free themselves from said material, and be ready to be again drawn up in place as before, and that when loaded with sticky material, such as wet clay, the dragging of the face of the bottom boards across the dump as the wagon moves away, will have a tendency to free them from such material.

Having thus described the construction and operation of my said improved dumping wagon, what I claim as my invention, and wish to secure by Letters Patent, is—

1. In a dumping wagon; the combination of two or more longitudinal bottom-boards, each of which is attached to the wagon box by holding chains secured at or near the middle of the bottom-board, and also by lifting chains which are attached at or near one edge of such board; and side-pieces having a vertical offset near the forward end of each adapted to fit over the bolster of an ordinary farm wagon, and a short reach for attaching the wagon box to the forward axle of such wagon.

2. In a dumping wagon; the combination comprising a wagon box with open bottom, and bottom-boards, each of which is attached thereto by holding chains secured at or near the middle of the bottom-boards and also by a lifting chain which is attached at or near one edge thereof; with means for tightening and holding said lifting chain.

3. In a dumping wagon; a wagon box the bottom of which consists of two or more boards, each of which is attached to the upper work of said box by a holding chain secured at or near the middle of the bottom board and also by a lifting chain which is attached at or near one edge of said bottom board.

In testimony that I claim the foregoing as my own I have hereunto affixed my signature in the presence of two witnesses.

HENRY S. HOY.

Witnesses:
EUGENE M. DOWNER,
A. K. STRONG.

It is hereby certified that in Letters Patent No. 532,785, granted January 22, 1895, upon the application of Henry S. Hoy, of Waddington, New York, for an improvement in "Dumping-Wagons," an error appears in the printed specification requiring the following correction, viz: In line 21, page 1, the word "light" should read *like;* and that the said Letters Patent should be read with this correction therein that the same may conform to the record of the case in the Patent Office.

Signed, countersigned, and sealed this 29th day of January, A. D. 1895.

[SEAL.]

JNO. M. REYNOLDS,
*Assistant Secretary of the Interior.*

Countersigned:
    JOHN S. SEYMOUR,
        *Commissioner of Patents.*